No. 767,517. PATENTED AUG. 16, 1904.
G. G. GLENN.
TOMATO PEELING MACHINE.
APPLICATION FILED MAY 13, 1904.
NO MODEL.
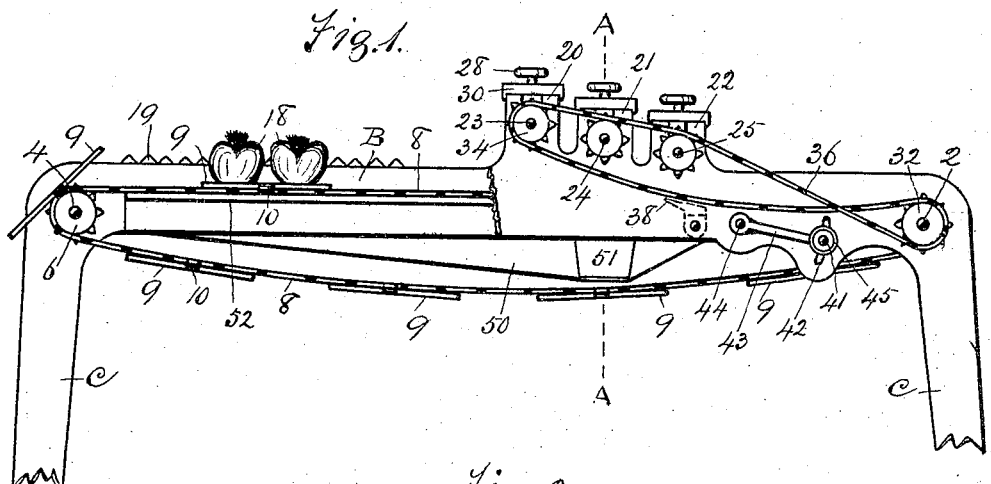
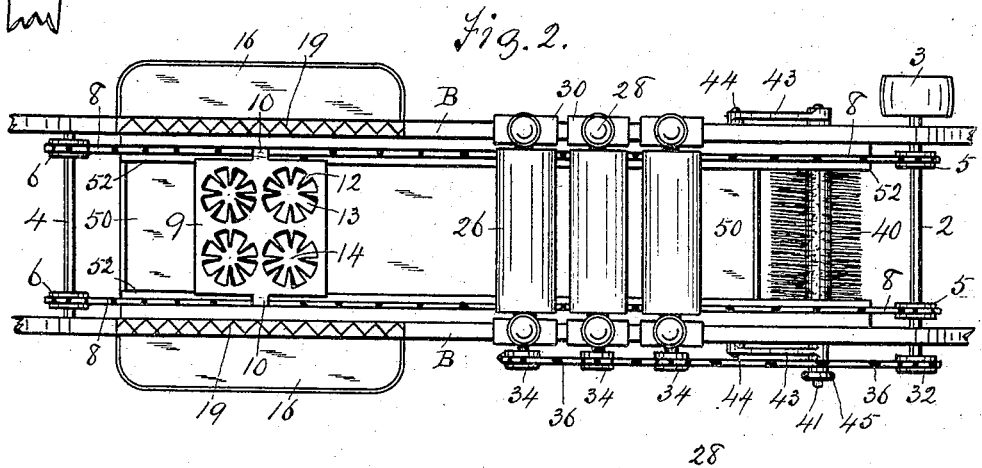
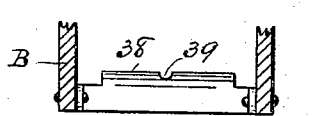
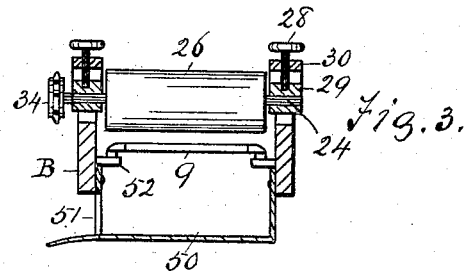
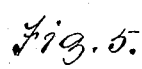
Witnesses.
Thos. A. Stokey
Wm. Marsden
Inventor.
George Graham Glenn
By John K. Hendry, Atty.

No. 767,517. Patented August 16, 1904.

UNITED STATES PATENT OFFICE.

GEORGE GRAHAM GLENN, OF HAMILTON, CANADA, ASSIGNOR OF ONE-HALF TO WILLIAM GODFREY LUMSDEN, OF HAMILTON, CANADA.

TOMATO-PEELING MACHINE.

SPECIFICATION forming part of Letters Patent No. 767,517, dated August 16, 1904.

Application filed May 13, 1904. Serial No. 207,800. (No model.)

*To all whom it may concern:*

Be it known that I, GEORGE GRAHAM GLENN, a citizen of Canada, and a resident of Hamilton, in the county of Wentworth, in the Province of Ontario, Canada, have invented new and useful Improvements in Tomato-Peeling Machines, of which the following is a specification.

My invention relates to improvements in tomato-peeling machines in which horizontal rotary chain belts are mounted on a frame and provided with a number of transverse plates connecting the belts, said plates having certain prongs or arms on which are placed the tomatoes, which pass under certain rotary rollers and over a stationary transverse knife-blade, which severs the meat of the tomato from the peel thereof and leaves the core with the peel.

The objects of my invention are, first, to provide a power-machine which is capable of peeling tomatoes in a most satisfactory manner; second, to provide a machine which is capable of removing the peeling or skin, stem, and core of the tomato in order to allow the meat and juice to fall into a receiver; third, to afford adjustable means of pressure on the tomatoes, and, fourth, to afford facilities for automatically cleaning or brushing the peelings and stems and cores from the traveling plates or tomato-holders and free the machine from said peelings, stems, and cores. I attain these objects by the mechanism illustrated in the accompanying drawings, in which—

Figure 1 is an elevation of a machine for peeling tomatoes, showing two tomatoes in position to travel to the transverse rollers and other parts, a part of the frame being broken away to show mechanism. Fig. 2 is a plan of the same, showing one of the transverse plates having seats for four tomatoes and a rotary brush for cleaning said plates. Fig. 3 is a sectional end elevation through the broken vertical line A A of Fig. 1 of the drawings. Fig. 4 is a broken sectional end elevation of the frame, showing the transverse knife secured thereto; and Fig. 5 is a section of said knife.

Similar letters refer to similar parts throughout the several views.

In the drawings the sides of the framework of the machine are indicated by B and may be of suitable length. The legs C are shown broken and may form a part of the sides B, as shown, or may be separate and suitably bolted thereto. The design or particular shape of the sides and legs of the framework is not deemed essential to the working and operation of the machine.

2 is the transverse drive-shaft, journaled in the sides B, with drive-pulley 3 secured to the shaft. A similar transverse shaft 4 is journaled at the opposite end of the machine. The shaft 2 is provided with sprocket-wheels 5, secured thereto and located on the inner sides of the sides B. The shaft 4 is provided with similar sprocket-wheels 6, secured thereto and directly opposite to the sprocket-wheels 5. The endless chain belts 8 run on said sprocket-wheels 5 and 6. The sprocket-wheels 5 drive the sprocket-wheels 6 by means of said belts.

The tomato-carrying plates 9, of any desired number, connect the belts 8 together by means of the central side straps or projections 10 of said plates. Said straps 10 are secured to said belts in such a manner to allow the plates 9 to travel with the belts around the sprocket-wheels 5 and 6, as shown at the left-hand part of Fig. 1 of the drawings.

It will be noticed that the plan of the plate 9 shown in Fig. 2 of the drawings is divisioned to carry four tomatoes. Each said division is divided into a number of prongs or arms 12, thereby producing through openings 13 and a center opening or hole 14, the openings 13 and the center opening 14 is one continuous opening in each said division of the plate and is to allow the meat and the juice of the tomato to fall through when the tomato is pressed. On the sides 2 of the frame are tomato-receptacles 16, and on said frame and immediately above the receptacles are corrugations or suitable raised parts 19, similar to a grater, in order that the tomato 18 may have the lower side or bottom part scraped and skinned by the operator on said corrugated parts previous to placing the tomato on the prongs 12 of the plate 9.

The sides B of the frame have raised graduated bearings 20, 21, and 22, graduated in height, the bearing part 20 being the highest and the bearing part 22 the lowest. These bearings carry the transverse shafts 23, 24, and 25, respectively. Each shaft carries a rubber roller 26, as shown in Fig. 3 of the drawings. The rollers 26 are adjustable—that is, said rollers may be raised or lowered to suit the size and quality of the tomato. The rollers 26 are adjusted by means of hand-wheels 28, the stems of which are threaded through the stationary caps 30 and connected to the slidable boxes 29, which are adapted to slide between the jaws of said bearings, so that when any pair of wheels 28 are revolved the boxes 29, together with a roller 26, are adjusted. I am fully aware that this feature of adjusting bearings is not by any means new.

The drive-shaft 2 has a sprocket-wheel 32 secured on the opposite end of said shaft to the drive-pulley 3. The shafts 24 in the slidable boxes 29 have each a sprocket-wheel 34 secured on the end of the shafts and in position to be driven by the sprocket-wheels 32 by means of the connecting chain belt 36, which is shown crossed in order to drive the sprocket-wheels 34, together with the rollers 26, in an opposite direction to the plates 9.

38 is a transverse knife, having a middle recess 39 in the knife to escape the cutting of the core of the tomato from the peeling. Said knife is secured to the inner sides of the frame B and located below the lowest of the three rollers 26 and immediately underneath the plates 9 in order to sever any protruding parts of the tomato from the under side of said plates when the same travel over the knife.

40 is a transverse rotary brush adapted to revolve loosely on a transverse spindle 41, which extends through the segmental slots 42 in the sides of the frame B. The side arms 43 are pivotally connected to the frame at 44 and the opposite end of said arms 43 are connected to said spindle 41. The hand-wheel 45 on the end of the spindle 41 is adapted to tighten the spindle 41 to a higher or a lower position in the slots 42. Consequently the brush is raised or lowered and adjusted at pleasure, according to the wear of the same and for the purpose intended—namely, to clean the under side and the openings 13 and 14 of said plates as the same travel underneath the brush. The plates 9 engage with the brush 40, and consequently revolve the brush.

50 is the peeled-tomato receptacle or box underneath the frame B and extending about as far as the frame B will allow, so as not to interfere with the operation of the sprocket-wheels 6 and the brush 40.

The bottom of the receiver 50 inclines from both ends thereof, the lowest part being below the middle roller 26 or thereabout, as desired.

51 is an outlet in the receiver 50 for the peeled tomatoes.

52 represents horizontal supports on the inner sides of the frame B and extend almost from the sprocket-wheels 6 to the sprocket-wheels 5 and which support the belts 8, thereby retaining the belts 8 in straight line when pressure is brought to bear on said belts by means of the rollers 26 pressing on the tomatoes 18 on the plates 9. The meat and the juice of the tomatoes drop through the openings 13 and 14 of the plate 9 and into the receiver 50 and are then removed through the outlet 51 of the receiver.

The operation of the machine is as follows: The belts 8 are revolved by means set forth. The tomatoes are taken from the receptacle 16. The skin from the bottom of the tomato is removed by the operator rubbing the tomato on the corrugations 19. The bottoms of the tomatoes are then placed on the prongs 12 of the plates 9. As the tomatoes travel toward and under the first roller 26 they are pressed by said roller, the middle and lower roller acting in a similar manner on the tomatoes, and the third or lowest roller 26 presses the tomatoes, leaving the skin or peel, together with the stem, on the prongs of the plate 9 and the core in the hole 14, while the knife 38 severs the meat of the tomato from the under side of the plate. The meat and juice consequently fall into the receiver 50 and are removed through the outlet 51. The brush 40 then operates on the under side of the plates 9 and cleans the same when said plate has traveled to lower position to engage the brush and revolve the same. The brush is positioned to enter the said openings in said plate 9.

What I claim as my invention, and desire to secure by Letters Patent, is—

1. In a tomato-peeling machine, a frame, chain belts in said frame, supports in the frame for said chains, plates connected to said belts, arms or prongs in said plates, adjustable transverse rollers in graduated bearings on the frame and above said plates, means to rotate the belts, and means to rotate said rollers, substantially as set forth.

2. In a tomato-peeling machine, a frame, horizontally-traveling belts in the frame, supports for the belts, transverse plates connecting the belts, openings through said plates, transverse rollers journaled in adjustable and graduated bearings on the frame, means for rotating the belts and means for rotating the rollers, and a transverse knife in the frame and underneath said plates, substantially as set forth.

3. In a tomato-peeling machine, a frame, endless belts in the frame, supports for the belts, transverse plates connecting the belts, openings through said plates, means for rotating the belts, transverse rollers journaled in graduated bearings on the frame, means for rotating the rollers and a brush adjustably journaled in the frame and revolved by contact with the plates, substantially as set forth.

4. In a tomato-peeling machine, a frame, having corrugations, endless belts in the frame, supports for the belts, plates connecting the belts, openings through the plates, means for rotating the chains, transverse rollers journaled in graduated and adjustable bearing on the frame, and means for rotating the rollers, substantially as set forth.

5. In a tomato-peeling machine, a frame having corrugations, tomato-receptacles on the sides thereof, endless belts in the frame, supports for the belts, plates connecting the belts, openings through the plates, means for rotating the belts, transverse rollers journaled in graduated and adjustable bearings on the frame, and means for rotating the rollers, substantially as set forth.

6. In a tomato-peeling machine, a frame, endless chains in the frame, supports for the chains, plates connecting the chains, openings through the plates, means for rotating the chains, transverse rollers, graduated and adjustable bearings on the frame for said rollers, means for rotating the rollers, an inclined receiver in the frame, and an outlet in the lowest part of the receiver, substantially as set forth.

GEORGE GRAHAM GLENN.

Witnesses:
   J. H. HENDRY,
   WM. TOCHER.